(12) United States Patent
Tessien (10) Patent No.: US 8,096,700 B2
(45) Date of Patent: Jan. 17, 2012

(54) HEAT EXCHANGE SYSTEM FOR A CAVITATION CHAMBER

(75) Inventor: Ross Alan Tessien, Nevada City, CA (US)

(73) Assignee: Impulse Devices Inc., Grass Valley, CA (US)

( * ) Notice: Subject to any disclaimer, the term of this patent is extended or adjusted under 35 U.S.C. 154(b) by 1544 days.

(21) Appl. No.: 10/961,353

(22) Filed: Oct. 7, 2004

(65) Prior Publication Data
US 2006/0018419 A1    Jan. 26, 2006

Related U.S. Application Data

(63) Continuation-in-part of application No. 09/448,753, filed on Nov. 24, 1999, now abandoned.

(51) Int. Cl.
*B01F 11/00* (2006.01)
(52) U.S. Cl. ............ 366/114; 250/493.1; 376/149
(58) Field of Classification Search ............ 250/493.1; 376/100, 149
See application file for complete search history.

(56) References Cited

U.S. PATENT DOCUMENTS

| | | | | | |
|---|---|---|---|---|---|
| 2,928,779 | A | * | 3/1960 | Weills et al. | 376/214 |
| 3,228,848 | A | * | 1/1966 | Fellows | 376/323 |
| 3,510,266 | A | * | 5/1970 | Midler, Jr. | 422/128 |
| 3,762,992 | A | | 10/1973 | Hedstrom | |
| 4,333,796 | A | * | 6/1982 | Flynn | 376/100 |
| 4,563,341 | A | | 1/1986 | Flynn | |
| 5,519,670 | A | * | 5/1996 | Walter | 367/142 |
| 5,523,058 | A | | 6/1996 | Umemura et al. | |
| 5,585,044 | A | * | 12/1996 | Kawakami et al. | 261/1 |
| 5,658,534 | A | | 8/1997 | Desborough et al. | |
| 5,659,173 | A | * | 8/1997 | Putterman et al. | 250/361 C |
| 5,810,037 | A | * | 9/1998 | Sasaki et al. | 134/111 |

(Continued)

FOREIGN PATENT DOCUMENTS

GB    774052    5/1957

(Continued)

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The American Physical Society, Published in: US.

(Continued)

*Primary Examiner* — Allen Flanigan
(74) *Attorney, Agent, or Firm* — Intrinsic Law Corp (57) ABSTRACT

A method and apparatus for regulating the temperature of the cavitation medium for a cavitation chamber is provided. The cavitation medium is pumped through the cavitation chamber through a pair of chamber inlets and an external conduit connecting the two inlets. An external heat exchanger is used to regulate the cavitation medium temperature, the heat exchanger being either directly or indirectly coupled to the conduit. The cavitation medium can be circulated through the heat exchanger during chamber operation or, once the desired cavitation medium temperature is achieved, operation of the circulation system can be suspended. The heat exchanger can be used to lower the temperature of the cavitation medium to a temperature less than the ambient temperature; to withdraw excess heat from the cavitation medium; or to heat the cavitation medium to the desired operating temperature. The heat exchanger can utilize heated heat exchange fluid, cooled heat exchange fluid, thermoelectric coolers, heat sinks, refrigeration systems or heaters. The cavitation medium circulation system can be configured to include a filter and/or a degassing chamber.

20 Claims, 10 Drawing Sheets

U.S. PATENT DOCUMENTS

| | | | |
|---|---|---|---|
| 5,858,104 A | | 1/1999 | Clark |
| 6,361,747 B1* | | 3/2002 | Dion et al. .................... 422/128 |
| 6,719,817 B1* | | 4/2004 | Marin ............................... 48/61 |
| 2004/0139908 A1* | | 7/2004 | Bowe et al. ....................... 117/2 |

FOREIGN PATENT DOCUMENTS

| | | |
|---|---|---|
| GB | 825026 | 12/1959 |
| WO | PCT/US97/10012 | 12/1997 |
| WO | PCT/CA03/00342 | 9/2003 |

OTHER PUBLICATIONS

Barber et al., Resolving the Picosecond Characteristics of Synchronous Sonoluminescence, J. Acoust. Soc. Am., May 1992, pp. 3061-3063, vol. 91, No. 5, Publisher: Acoustical Society of America, Published in: US.

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America.

Crum, Sonoluminescence, Physics Today, Sep. 1994, pp. 22-29, Publisher: American Institute of Physics, Published in: US.

Young, Sonoluminescence from Water Containing Dissolved Gases, J. Acoust. Soc. Am., Jul. 1976, pp. 100-104, vol. 60, No. 1, Publisher: Acoustical Society of America, Published in: US.

Sehgal et al., Sonoluminescene Intensity as a Function of Bulk Solution Temperature, Phys. Chem., 1980, pp. 525-528, vol. 84, No. 5, Publisher: American Chemical Society, Published in: US.

Walton et al., Sonoluminescence, Advances in Physics, 1984, pp. 595-660, vol. 33, No. 6, Published in: US.

Barber, Synchronous Picosecond Sonoluminescence, Dissertation, 1992, pp. 1-130, Publisher: University of California, Los Angeles, Published in: US.

Bollinger, Ultra Cavitation, http://wiretap.area.com/Gopher/Library/Article/Sci/cavitate.ult, Sep. 17, 2001, pp. 1-26.

Hilgenfeldt et al., Water Temperature Dependence of Single Bubble Sonoluminescence, Physical Review Letters, 1998, pp. 1332-1335, vol. 80, No. 6, Publisher: The American Physical Society, Published in: US.

* cited by examiner

FIG. 12

HEAT EXCHANGE SYSTEM FOR A CAVITATION CHAMBER

REFERENCE TO RELATED APPLICATIONS

This application is a continuation-in-part of U.S. patent application Ser. No. 09/448,753, filed Nov. 24, 1999 now abandoned.

FIELD OF THE INVENTION

The present invention relates generally to sonoluminescence and, more particularly, to a heat exchange system for use with a sonoluminescence cavitation chamber.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to not only completely characterize the phenomena (e.g., effects of pressure on the cavitating medium), but also its many applications (e.g., sonochemistry, chemical detoxification, ultrasonic cleaning, etc.). A by-product of this research have been several patents claiming various aspects of the process.

U.S. Pat. No. 4,333,796 discloses a cavitation chamber comprised of a refractory metal such as tungsten, titanium, molybdenum, rhenium or some alloy thereof. Acoustic energy is supplied to the liquid (e.g., lithium or an alloy thereof) within the chamber by six metal acoustic horns coupled to transducers. The tips of the horns project into the chamber while the rearward portion of each horn is coupled to a heat exchanger system, the heat exchanger system withdrawing heat generated by the reactions within the chamber and conducted out of the chamber via the metal horns. The inventors note that by removing heat in this manner, the liquid remains within the chamber, thus avoiding the need to pump the chamber liquid. An external processing system with a combination pump and mixer is disclosed for removing deuterium and tritium gases released from the cavitation zone and trapped within the chamber or tritium gases trapped within the Li-blanket surrounding the chamber and then reintroducing the previously trapped deuterium and tritium into the cavitation zone. Additional deuterium may also be introduced into the mixer.

U.S. Pat. No. 4,563,341, a continuation-in-part of U.S. Pat. No. 4,333,796, discloses a slightly modified, cylindrical cavitation chamber. The chamber is surrounded by an external heating coil which allows the liquid within the chamber to be maintained at the desired operating temperature. The system is degassed prior to operation by applying a vacuum through a duct running through the cover of the chamber. During operation, the inventor notes that graphite, dissolved in the host liquid metal, is converted to diamond. The diamond-rich host material is removed via an outlet duct adjacent to the bottom of the chamber and graphite-rich host material is removed via an outlet duct adjacent to the upper end of the chamber. Additional host material and graphite are added by lowering rods comprised of the host material and graphite, respectively, into the heated chamber.

U.S. Pat. No. 5,659,173 discloses a sonoluminescence system that uses a transparent spherical flask fabricated from Pyrex®, Kontes®, quartz or other suitable glass and ranging in size from 10 milliliters to 5 liters. The inventors disclose that preferably the liquid within the flask is degassed and the flask is sealed prior to operation. In one disclosed embodiment, the cavitation chamber is surrounded by a temperature control system, thus allowing the liquid within the chamber to be cooled to a temperature of 1° C.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber. Another transducer mounted in the chamber wall delivers a compressional acoustic shock wave into the liquid. A flexible membrane separating the liquid from the gas reflects the compressional shock wave as a dilation wave focused on the location of the object about which a bubble is formed.

Although a variety of sonoluminescence systems have been designed, typically these systems allow limited control of the conditions applied to the liquid within the chamber. Accordingly, what is needed is a cavitation chamber that allows easy control of the temperature and composition of the cavitating liquid within the chamber. The present invention provides such an apparatus.

SUMMARY OF THE INVENTION

The present invention provides a method and apparatus for regulating the temperature of the cavitation medium of a cavitation chamber. In one aspect of the invention the cavitation medium is pumped through the cavitation chamber through a pair of chamber inlets and an external conduit connecting the two inlets. An external heat exchanger is used to regulate the cavitation medium temperature, the heat exchanger being either directly or indirectly coupled to the conduit. The cavitation medium can be circulated through the heat exchanger during chamber operation or, once the desired cavitation medium temperature is achieved, operation of the circulation system can be suspended. Preferably at that point the chamber is also decoupled from the circulation system, for example by closing a pair of valves corresponding to the pair of chamber inlets.

In one embodiment the heat exchanger of the invention is used to lower the temperature of the cavitation medium to a temperature less than the ambient temperature. Alternately the heat exchanger can be configured to withdraw excess heat from the cavitation medium, for example heat generated by reactions within the cavitation chamber. Alternately the heat exchanger can be configured to heat the cavitation medium to the desired operating temperature, thus promoting specific reactions within the cavitation chamber or maintaining the cavitation medium in the liquid phase.

Depending upon the temperature of the cavitation medium entering the heat exchanger as well as the desired cavitation medium temperature, the heat exchanger can utilize heated heat exchange fluid, cooled heat exchange fluid, thermoelectric coolers, heat sinks, refrigeration systems or heaters.

In another aspect of the invention, the cavitation medium circulation system includes a filter, preferably for removing contaminants that could disrupt the cavitation process.

In another aspect of the invention, the cavitation medium circulation system includes a degassing chamber.

A further understanding of the nature and advantages of the present invention may be realized by reference to the remaining portions of the specification and the drawings.

DESCRIPTION OF THE SPECIFIC EMBODIMENTS

Figure 1:
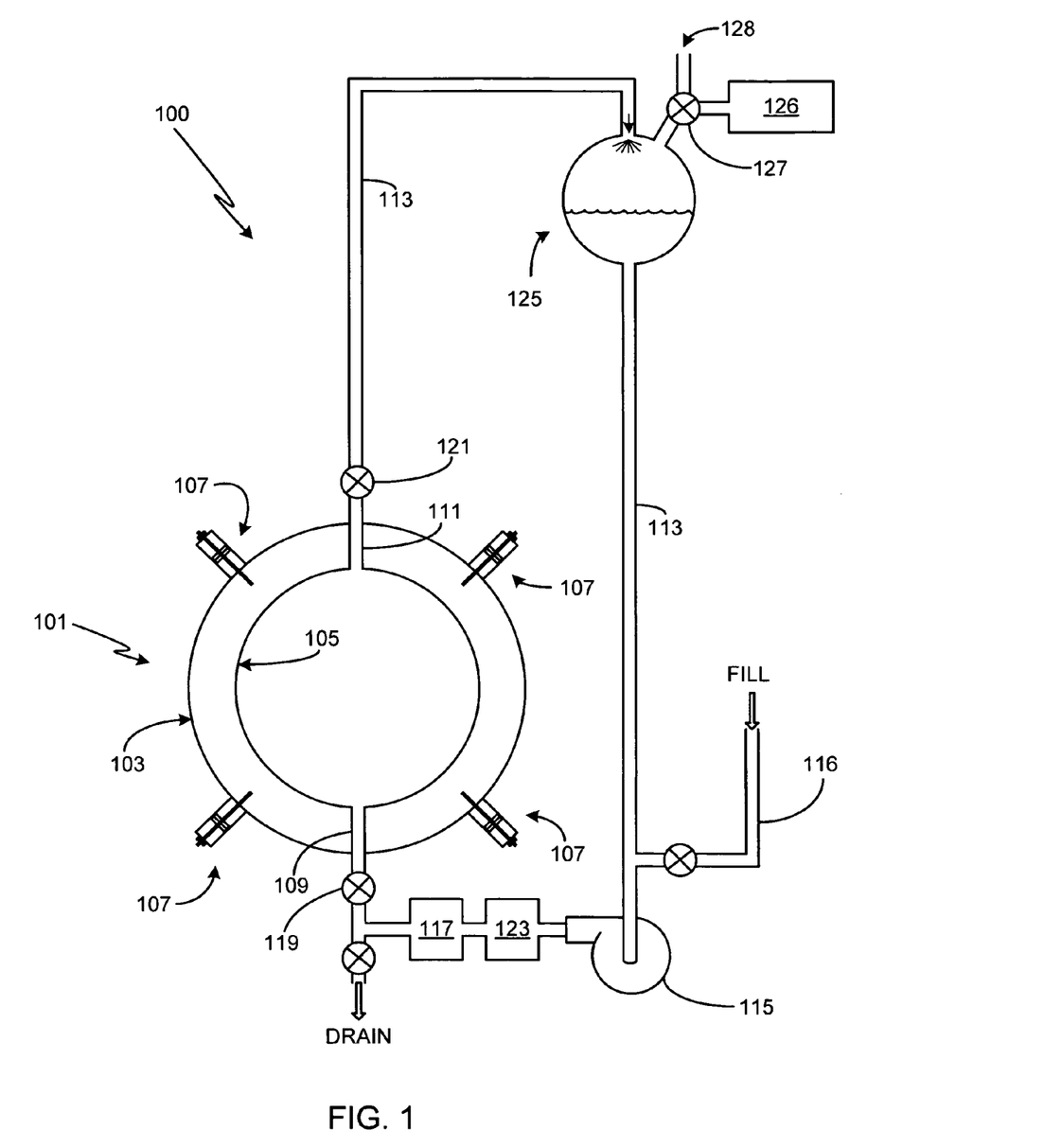
FIG. 1 is an illustration of the primary elements of a cavitation system in accordance with the invention.

FIG. 1 is an illustration of the primary elements of a cavitation system 100 in accordance with the invention. The principal component is the sonoluminescence cavitation chamber 101, hereafter referred to as simply a cavitation chamber. Preferably cavitation chamber 101 is spherical, although it will be appreciated that the invention is not so limited and that cavitation chambers of other configurations (e.g., cylinder, conical, cubic, rectangular, irregular, etc.) can also be used with the present invention. One method of fabricating chamber 101 is described in detail in co-pending U.S. patent application Ser. No. 10/925,070, filed Aug. 23, 2004, entitled Method of Fabricating a Spherical Cavitation Chamber, the entire disclosure of which is incorporated herein for any and all purposes.

Illustrated chamber 101 has an outer spherical surface 103 defining the outer diameter of the chamber and an inner spherical surface 105 defining the inner diameter of the chamber. Chamber 101 can be fabricated from any of a variety of metals although there are some constraints placed on the chamber material. First, the material is preferably machinable, thus simplifying the fabrication process. Second, if the chamber is to be operated at a high temperature, the chamber material should have a relatively high melting temperature. Additionally, depending upon the process used to assemble individual chamber pieces together (e.g., brazing), a high melting temperature is preferred as it aids the assembly process. Third, the chamber material should be corrosion resistant, thus allowing the chamber to be used repeatedly. Fourth, the material should be hard enough to allow a good surface finish to be obtained. In one preferred embodiment of the invention, the chamber is fabricated from 17-4 precipitation hardened stainless steel.

With respect to the dimensions of the chamber, both inner and outer diameters, the selected sizes depend upon the intended use of the chamber. For example, smaller chambers are typically preferable for situations in which it is desirable to limit the amount of cavitating medium, for example due to cost or due to limited available energy to drive the cavitation process. On the other hand large chambers, on the order of 8-10 inches or greater, typically simplify experimental set-up and event observation. Thick chamber walls are preferable if the chamber is to be operated at high static pressures. Although the invention is not limited to specific dimensions as previously noted, typical wall thicknesses include 0.25 inches, 0.5 inches, 0.75 inches, 1.5 inches, 2.375 inches, 3.5 inches and 4 inches. Typical outside diameters are in the range of 2-10 inches although larger chambers are useful if sufficient cavitation driving energy is available.

Depending upon the desired cavitation reaction, any of a variety of liquids can be used as the cavitating medium. For example, in one preferred embodiment acetone is used as the cavitating medium. In another embodiment in which the cavitation of the medium could hypothetically result in in a nuclear reaction, the cavitating medium is comprised of a host material and a fuel material. The host material is selected from lithium, aluminum, tin, mercury, cadmium, sodium, potassium, gallium, gadolinium indium, lead, bismuth, or an alloy thereof. The fuel material is selected from deuterium, tritium, lithium, or a combination thereof. Alternately the host and fuel materials can be molecularly combined into a single material, e.g., deuterated acetone, heavy water ($D_2O$) and deuterated ethylene glycol. For such hypothetical induced fission reactions, the fuel material is preferably uranium or thorium. In another embodiment in which the cavitation of the medium could hypothetically result in a neutron stripping reaction, preferably between a heavy isotope and a light isotope, the heavy isotope is selected from gadolinium, cadmium, europium, boron, samarium, dysprosium, iridium, mercury, or a mixture thereof while the light isotope is selected from the group consisting of deuterium, tritium, lithium, or a mixture thereof. In this embodiment preferably the heavy isotope has a large thermal neutron capture cross-section, and even more preferably with a thermal neutron capture cross-section of greater than 10 barns.

Figure 2:
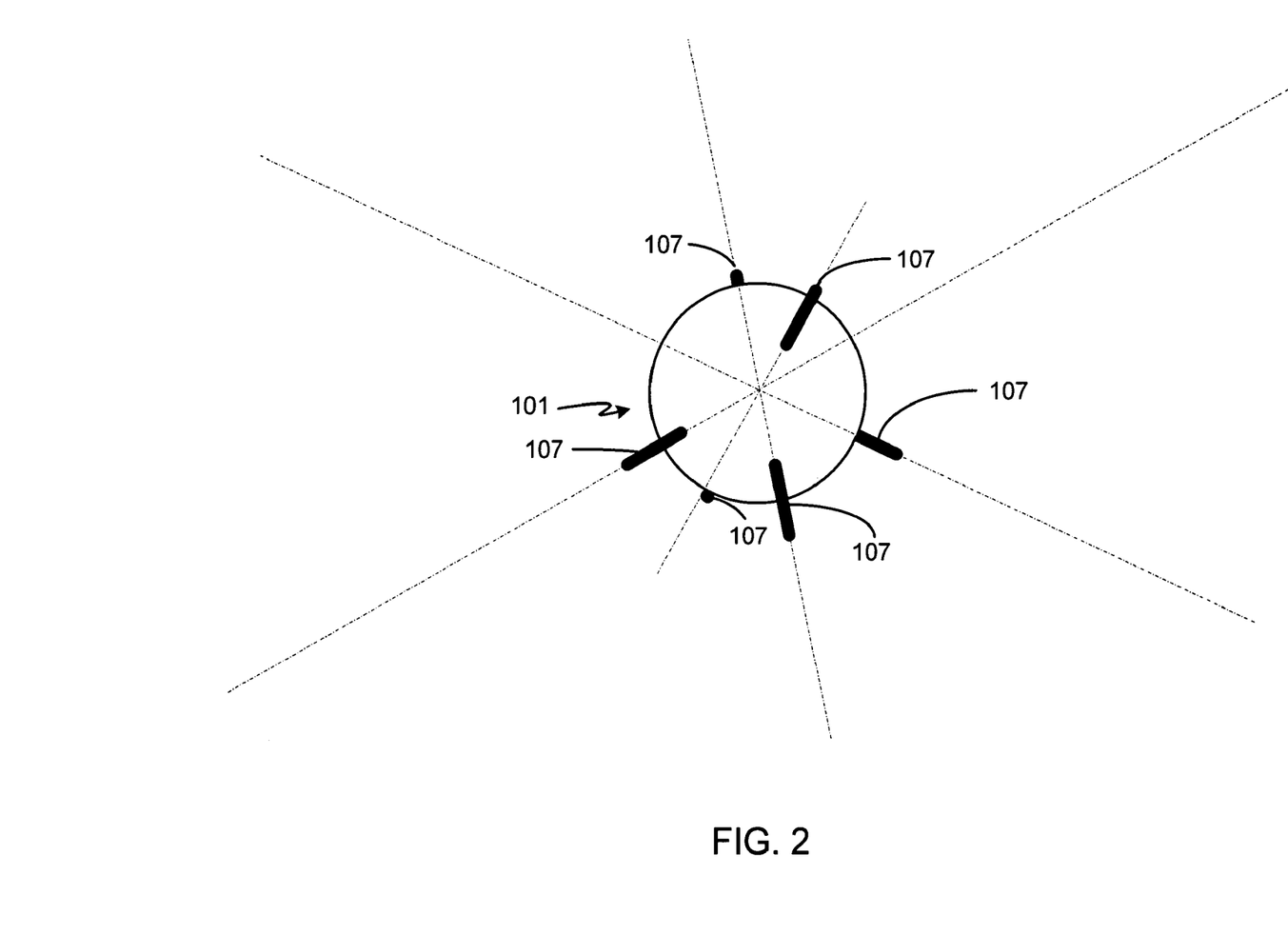
FIG. 2 is an illustration of a spherical cavitation chamber with six mounted acoustic transducers.

Attached to chamber 101 are one or more means of driving energy into the chamber in order to cause the desired cavitation of the liquid contained therein. In a preferred embodiment, acoustic drivers (i.e., transducers) 107 are coupled to the exterior surface 103 of chamber 101. In at least one embodiment of the invention in which the chamber is spherical, six acoustic transducers are mounted to the exterior surface of the cavitation chamber, four mounted to the lower hemisphere and two mounted to the upper hemisphere as illustrated in FIG. 2. Acoustic drivers can be fabricated and mounted, for example, in accordance with co-pending U.S. patent application Ser. No. 10/931,918, filed Sep. 1, 2004, entitled Acoustic Driver Assembly for a Spherical Cavitation Chamber, the entire disclosure of which is incorporated herein for any and all purposes. It will be appreciated that the invention is not limited to a particular number of transducers, nor is the invention limited to having transducers mounted to one or more particular locations. Additionally it should be appreciated that suitable drivers can utilize piezoelectric transducers, magnetostrictive devices, particle discharge systems, pulsed liquid jet generators, or other means.

In one preferred embodiment, the drivers are located at acoustic pressure antinodes. The operating frequency of the drivers depends upon a variety of factors including, for example, the sound speed of the liquid within the chamber, the shape/geometry of the chamber, the sound field geometry of the drivers, etc. In at least one embodiment, the operating frequency is within the range of 1 kHz to 10 MHz. The selected frequency can be the resonant frequency of the chamber, an integer multiple of the resonant frequency, a non-integer multiple of the resonant frequency, or periodically altered during operation, preferably by less than ±10%.

A pair of conduits 109 and 111, preferably located at the bottom and the top portions, respectively, of chamber 101, and more preferably located at the lowermost portion and the uppermost portions of chamber 101, allow the chamber to be filled, drained, degassed, replenished during operation (e.g., fuel replenishment), and/or cleaned/degassed during operation (e.g., removal of generated gases or other by-products). Preferably conduits 109 and 111 as well as any other conduits are coupled to the cavitation chamber at displacement nodes, thus minimizing both lost energy and the effects that the cavitating medium will have on the conduits. If the cavitation chamber is spherical as in the illustrated embodiments, such mounting locations are not possible if the chamber is driven at the fundamental frequency as there are no minimum displacement nodes with such a chamber and drive frequency. Accordingly with such a chamber the drive frequency can be selected to generate displacement nodes where the conduits may be coupled, for example using non-resonant drive frequencies.

Figure 3:
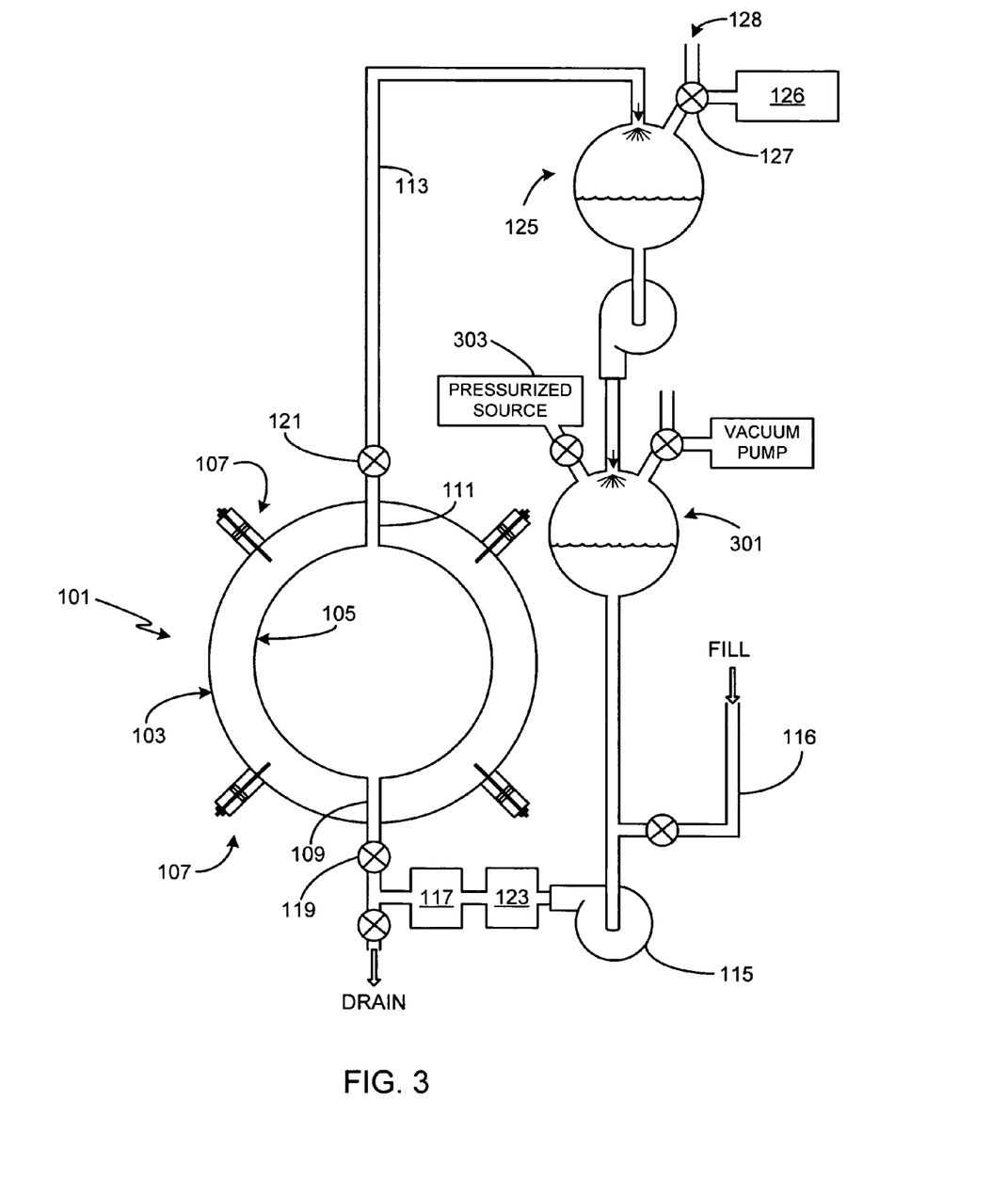
FIG. 3 is an illustration of a cavitation system similar to that shown in FIG. 1, with the addition of a pressurized fuel source.

Conduits 109 and 111 are both coupled to pipe 113, thus allowing the cavitation medium to be cycled using one or more pumps 115. As discussed further below, one or more additional system elements can also be coupled to pipe 113, thus allowing the properties of the cavitation fluid to be externally monitored or controlled. Preferably a fill inlet 116 is also coupled to pipe 113, preferably at a location prior to pump 115, providing both a means of filling the system with the cavitation fluid and, in certain embodiments, replenishing the fuel or other reactants contained within the cavitation fluid during operation. In at least one embodiment, as illustrated in FIG. 3, the system includes an additional chamber 301 for either adding more cavitation fluid or replenishing the fuel or other reactants. In this embodiment the material 303 to be added (e.g., fuel) is pressurized prior to entering chamber 301.

In a preferred embodiment of the invention, a heat exchanger 117 is coupled to pipe 113, thus allowing the temperature of the cavitation fluid to be controlled. The cavitation fluid can either be continually pumped through heat exchanger 117, i.e., during chamber operation, or used to alter the temperature of the fluid prior to chamber operation. In the latter embodiment after the desired temperature is reached, pump 115 is turned off and preferably valves 119 and 121 are closed. A benefit of closing valves 119 and 121 prior to operation is that during cavitation the cavitating fluid is heated due to the cavitation process as well as any reactions taking place within the chamber. Due to the differential expansion of the fluid versus chamber walls 105, the pressure within the chamber increases, leading to stronger cavitation reactions.

In a preferred embodiment heat exchanger 117 is used to cool the cavitation fluid below ambient temperature, thus lowering the vapor pressure of the fluid and allowing higher velocities to be achieved by the collapsing bubbles within the chamber. As a result, the cavitating bubbles generate higher temperatures. In this embodiment heat exchanger 117 is preferably located after pump 115 and as close to conduit 109 as reasonable, thus minimizing the introduction of heat into the cooled cavitation medium from, for example, pump 115, the surroundings, etc.

In another embodiment heat exchanger 117 cools the cavitation fluid by withdrawing excess heat generated within the chamber. The excess heat can be a product of the cavitation process itself as the cavitating bubbles generate heat within the fluid. The excess heat can also be the product of reactions taking place within the chamber which are promoted by the cavitation process. Such reactions include both chemical reactions and, and, hypothetically speaking, the aforementioned nuclear reactions. The excess heat can also be the result of heat conducted into the cavitation medium from drivers 107. In this embodiment heat exchanger 117 is preferably located before pump 115, i.e, at some location between conduit 111 and pump 115 (as opposed to the mounting location shown in FIG. 1). This mounting location is preferred as it cools the cavitation fluid before introducing it into pump 115. It will be appreciated that whether heat exchanger 117 is located before or after pump 115 depends upon the temperatures of the cavitation fluid before and after heat exchanger 117, the ambient temperature and the preferred operating temperatures of pump 115.

In another embodiment heat exchanger 117 is used to heat the cavitation fluid to the desired operational temperature. Such heating is useful, for example, to promote specific reactions (e.g., chemical reactions) within the cavitation fluid or to maintain the cavitating medium in the fluid phase (i.e., heating to above the melting temperature of the medium). Preferably heat exchanger 117 is positioned relative to pump 115 as shown, thus allowing pump 115 to pump a relatively cool fluid. As previously noted, the location of heat exchanger 117 relative to pump 115 depends upon the temperatures of the cavitation fluid before and after heat exchanger 117, ambient temperature and the preferred operating temperatures of pump 115.

Figure 4:
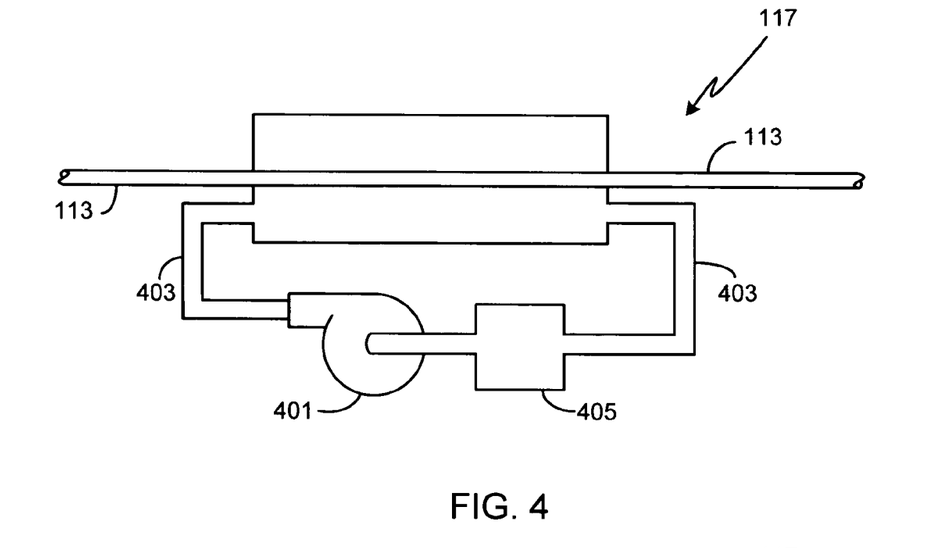
FIG. 4 is an illustration of one embodiment of a heat exchanger in which the heat exchange fluid is in direct contact with a conduit carrying the cavitation fluid.
Figure 5:
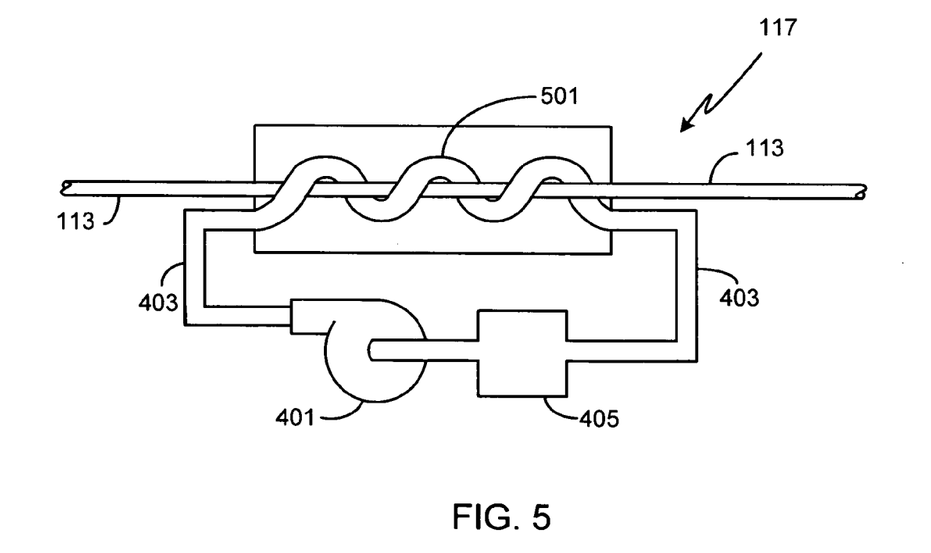
FIG. 5 is an illustration of another embodiment of a heat exchanger in which the heat exchange fluid is pumped through a conduit maintained in close proximity to a portion of the conduit carrying the cavitation fluid.

Heat exchangers are well known by those of skill in the art, and therefore detailed descriptions of possible means of implementing heat exchanger 117 are not provided herein. In general, heat is conducted into or out of pipe 113 by placing a portion of pipe 113 in thermal contact, direct or indirect, with (i) a heated fluid, (ii) a cooled fluid, (iii) a thermoelectric cooler, (iv) a heat sink, (v) a refrigeration system or (v) a heating system. Heat exchanger 117 can also use a combination of heaters/coolers to provide complete temperature regulation of the cavitation fluid. Assuming that heat exchanger 117 uses a temperature regulated fluid, either heated or cooled, the fluid can either be in direct contact with pipe 113 as illustrated in FIG. 4, or contained within a separate pipe 501 as illustrated in FIG. 5. Preferably if a heat exchange fluid is used (e.g., FIGS. 4 and 5), the heat exchange fluid is pumped with a pump 401 through a pipe 403 to an appropriate heater or cooler 405. The location of the heater or cooler relative to pump 401 typically depends on whether heat is being added (e.g., use of a heater) or withdrawn (e.g., use of a cooler) as pump 401 generally operates best if the temperature of the heat exchange fluid is relatively cool. Accordingly if the system uses a cooler to lower the temperature of the heat exchange fluid temperature after it has been heated by pipe 113, typically the cooler is located before the intake of pump 401 as shown in FIGS. 4 and 5. If a heater is being used to heat the heat exchange fluid prior to passing through heat exchanger 117, typically the heater is located between the output of pump 401 and heat exchanger 117 (not shown). It will be appreciated that the location of the heater or cooler depends on the temperatures of the fluid, both before and after being thermally conditioned, and it will also be appreciated that the general rules noted above may not be followed, depending upon the preferred operating conditions of pump 401 and the specific temperatures involved. Any of a variety of well known techniques can be used in the heater/cooler 405 (e.g., gas heaters, refrigeration units, etc.).

Figure 6:
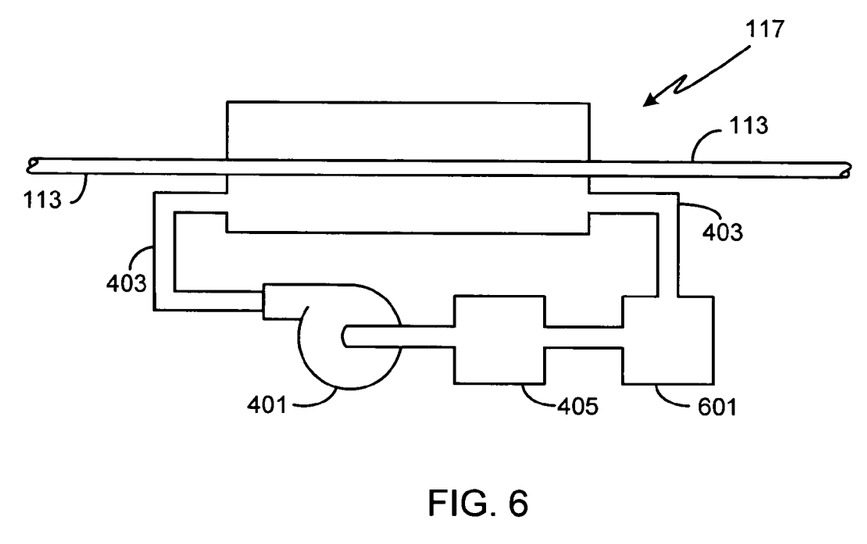
FIG. 6 is an illustration of an embodiment of a heat exchanger similar to that shown in FIG. 4 except for the addition of a thermally powered system.
Figure 7:
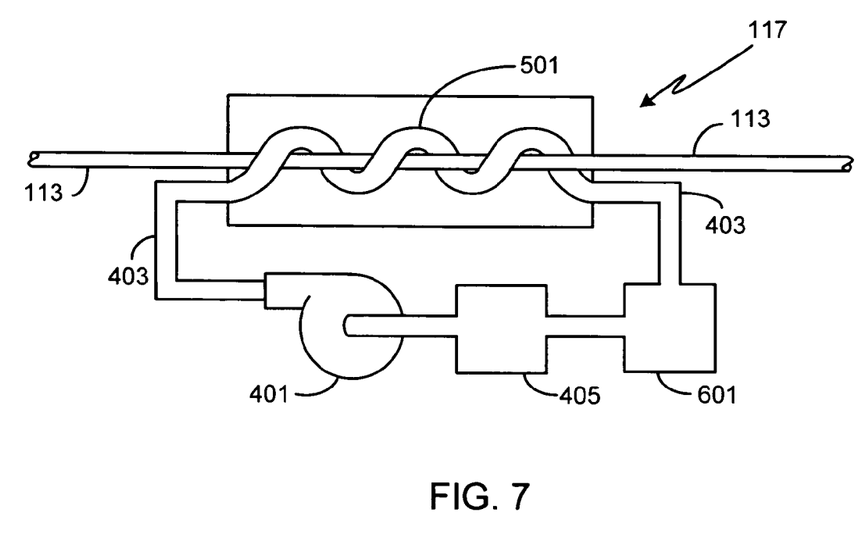
FIG. 7 is an illustration of an embodiment of a heat exchanger similar to that shown in FIG. 5 except for the addition of a thermally powered system.

If sufficient heat is withdrawn from the cavitating liquid by heat exchanger 117, the excess heat can be used as illustrated in FIGS. 6 and 7 to drive any of a variety of thermally powered systems 601 (e.g., heaters, steam turbines, etc.). Preferably thermally powered system 601 is sufficiently efficient to eliminate the need for cooler 405. If desired, however, cooler 405 can be used to further lower the temperature of the heat exchange fluid.

In another aspect, system 100 preferably includes a filter 123 which removes contaminants from the cavitation fluid, thus preventing the contaminants from potentially disrupting the cavitation process. The contaminants may be native to the cavitation fluid. Alternately, or in addition to native contaminants, the contaminants to be removed may be a product of the cavitation process itself, for example resulting from the flow of the cavitation fluid through the heat exchange system or from the effects of the cavitation process on the internal surfaces of the cavitation chamber. Alternately, or in addition to the above-described contaminants, the contaminants may be a by-product of a reaction taking place within the cavitation chamber. It will be appreciated that the exact nature of filter 123 depends upon the type of contamination, i.e., impurity, to be removed from the cavitation fluid. As filters are well know, further description is not provided herein.

In another aspect, system 100 includes means for degassing chamber 101 and the cavitation fluid, thus allowing higher velocities to be achieved by the collapsing bubbles within the chamber. As a result, the cavitating bubbles generate higher temperatures. As chamber 101 is often completely filled with the cavitation fluid during operation, preferably the system includes a separate chamber 125 for degassing. Prior to degassing, the system is filled with cavitation fluid such that chamber 101, pipe 113, pump 115, and filter 123 are completely filled while chamber 125 is only partially filled. A vacuum pump 126 is attached to chamber 125 via a three-way valve 127, valve 127 allowing chamber 125 to either be coupled to pump 126 or open to the atmosphere via conduit 128. Vacuum pump 126 is used to degas the system. By performing the degassing operation while pumping the cavitation fluid through the system, and assuming that conduit 111 is located at the top of chamber 101 as illustrated to insure that gas is not trapped within the chamber, the entire system can be degassed. Once degassed, the degassing process can be continued while continually pumping the cavitation fluid through the system and operating the cavitation chamber. One benefit of this procedure is the removal of gases generated as a by-product of reactions that may hypothetically take place within chamber 101 (e.g., helium and/or hydrogen that are by-products of many fusion, fission, spallation and neutron stripping reactions). Alternately the degassing procedure can be performed periodically during chamber operation. Alternately after completion of an initial degassing procedure, chamber 101 can be decoupled from the system with valves 119 and 121 and the degassing procedure discontinued.

Figure 8:
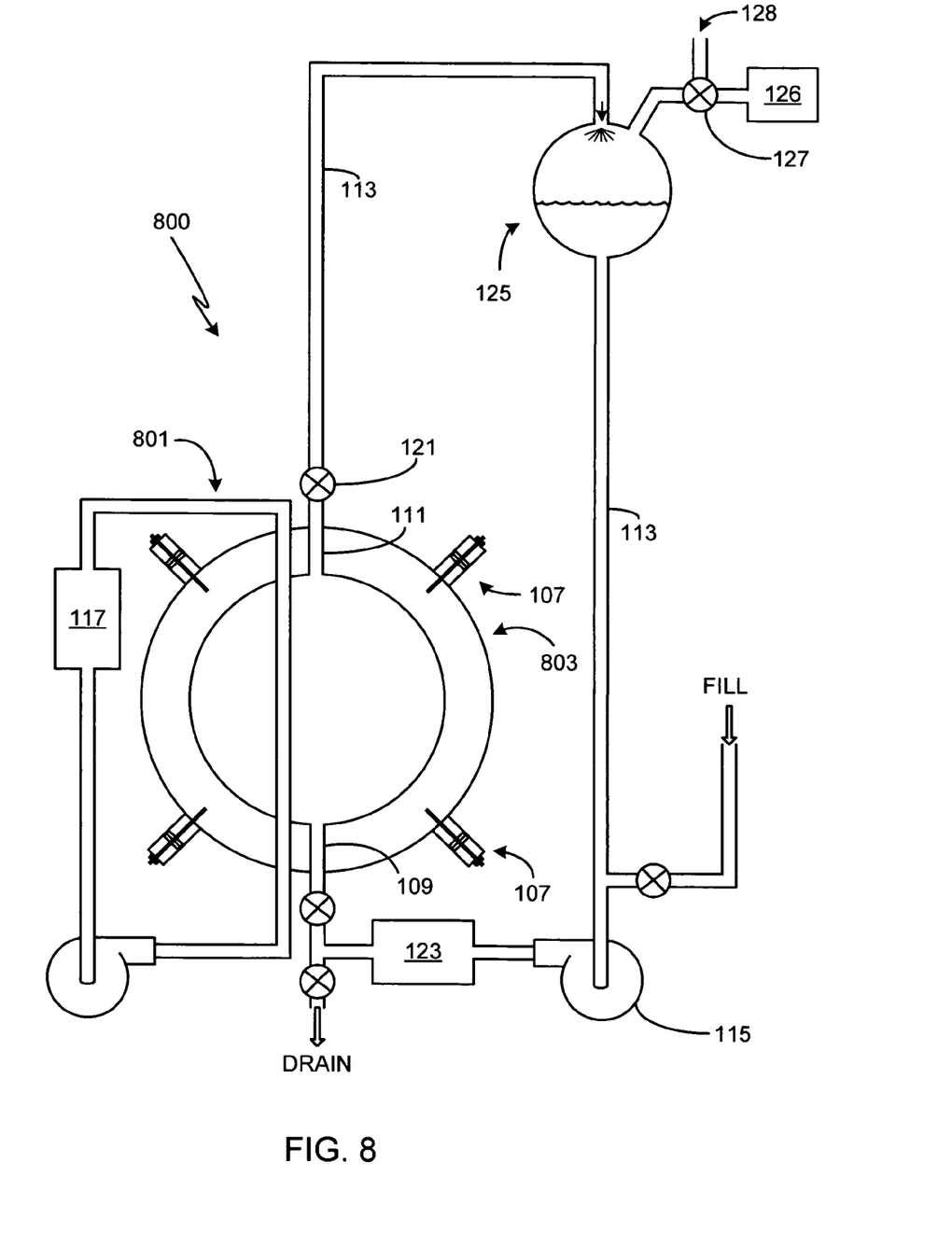
FIG. 8 is an illustration of an alternate embodiment of the invention in which at least one heat exchange pipe passes through the cavitation chamber.
Figure 9:
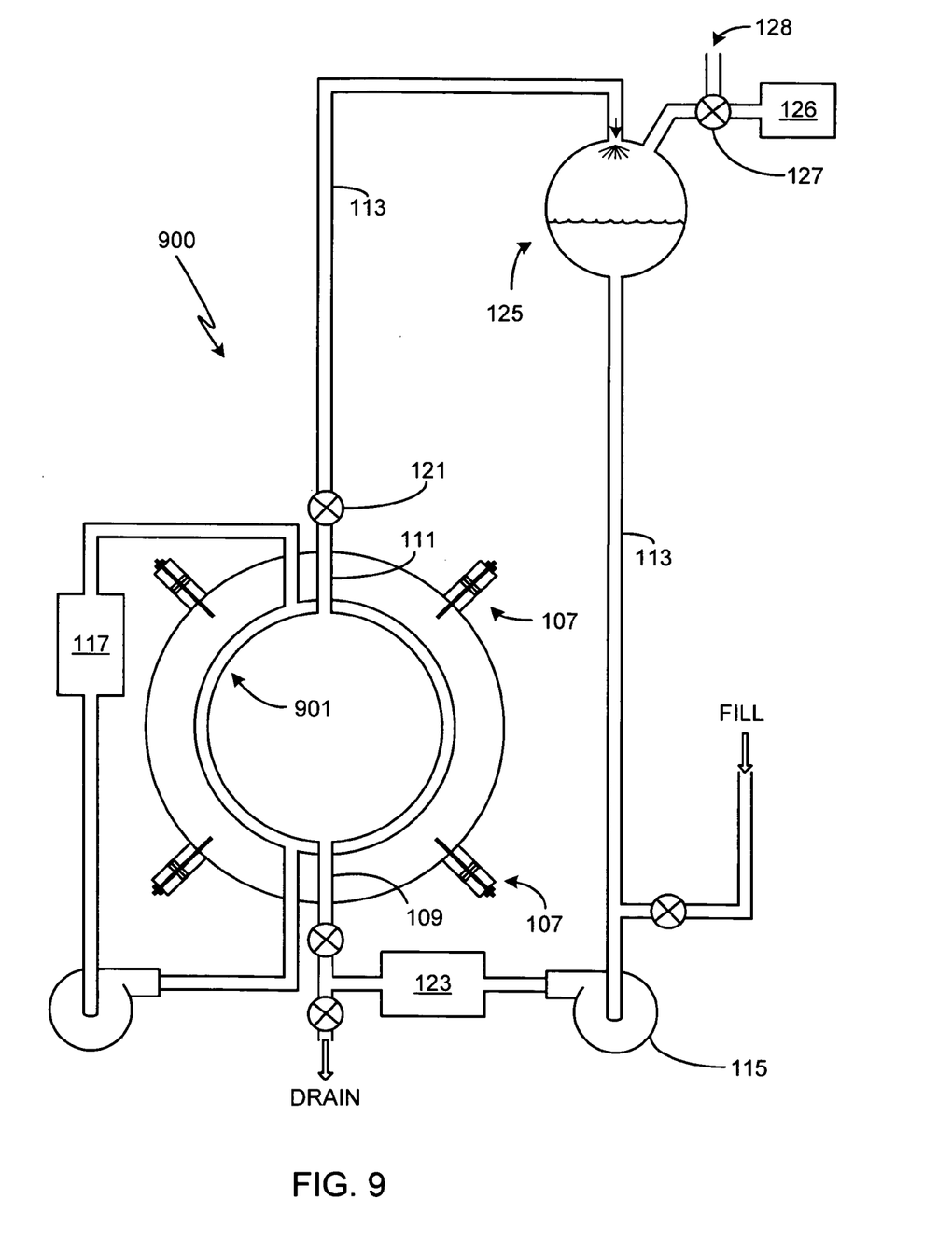
FIG. 9 is an illustration of an alternate embodiment of the invention in which the heat exchange fluid passes through an inner shell of the cavitation chamber.
Figure 10:
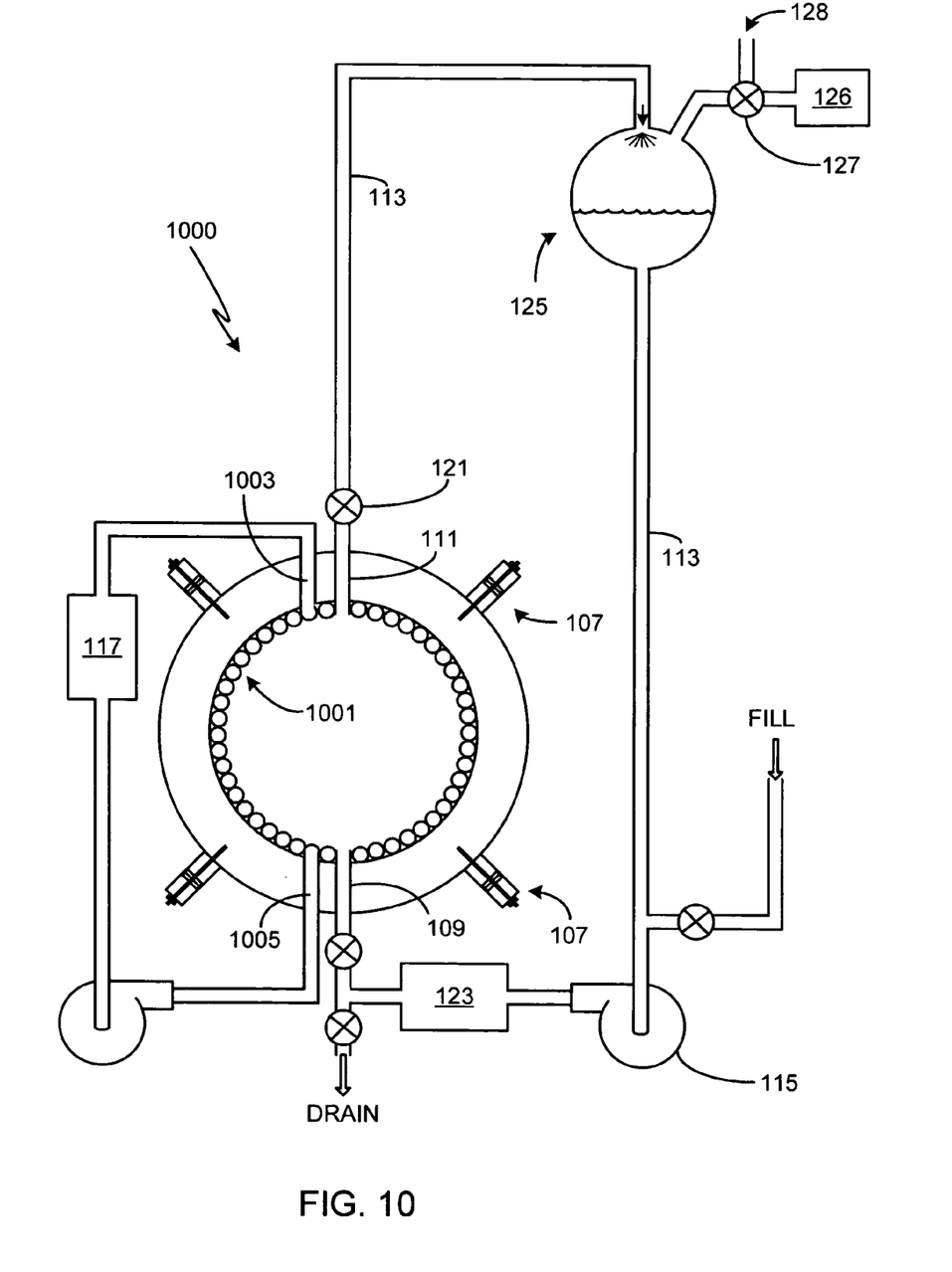
FIG. 10 is an illustration of an alternate embodiment of the invention in which the heat exchange fluid passes through an internal heat exchange pipe designed to cover most of the inner surface of the cavitation chamber.

FIGS. 8-10 illustrate alternate embodiments of the invention in which the degassing and heat exchange operations are separated. For example, FIG. 8 is an illustration of a system 800 in which at least one heat exchange pipe 801 passes through chamber 803 and the cavitation medium contained therein. FIG. 9 is an illustration of a system 900 in which the heat exchange fluid passes through an inner shell 901 that covers at least a portion of the inner surface of the cavitation chamber, and preferably the entire inner surface of the cavitation chamber. FIG. 10 is an illustration of system 1000 in which the heat exchange fluid passes through a heat exchange pipe 1001 covering most of the internal surface of the cavitation chamber. Heat exchange pipe 1001 can be formed, for example, by wrapping the pipe around a suitably sized and shaped mandrel. During chamber fabrication heat exchange pipe end portions 1003 and 1005 are passed through the chamber walls and then sealed to the cavitation chamber, for example using epoxy, brazing, etc. An example of a suitably sized/shaped mandrel is a spherical mandrel with an outside diameter such that the mandrel's diameter plus two times the outside diameter of the heat exchange pipe is slightly less or approximately equal to the inside diameter of the cavitation chamber.

The embodiments shown in FIGS. 8-10 are problematic for a variety of reasons. First, systems 800, 900 and 1000 lack the fabrication efficiency provided by combining the heat exchange and degassing systems. Second, pipe 801, inner surface 903 of shell 901, and pipe 1001 must be capable of handling the desired operating pressure of the cavitation chamber. Third, in the case of systems 800 and 1000, the intrusion of the heat exchange pipe running through the cavitation chamber complicates the cavitation geometry.

Figure 11:
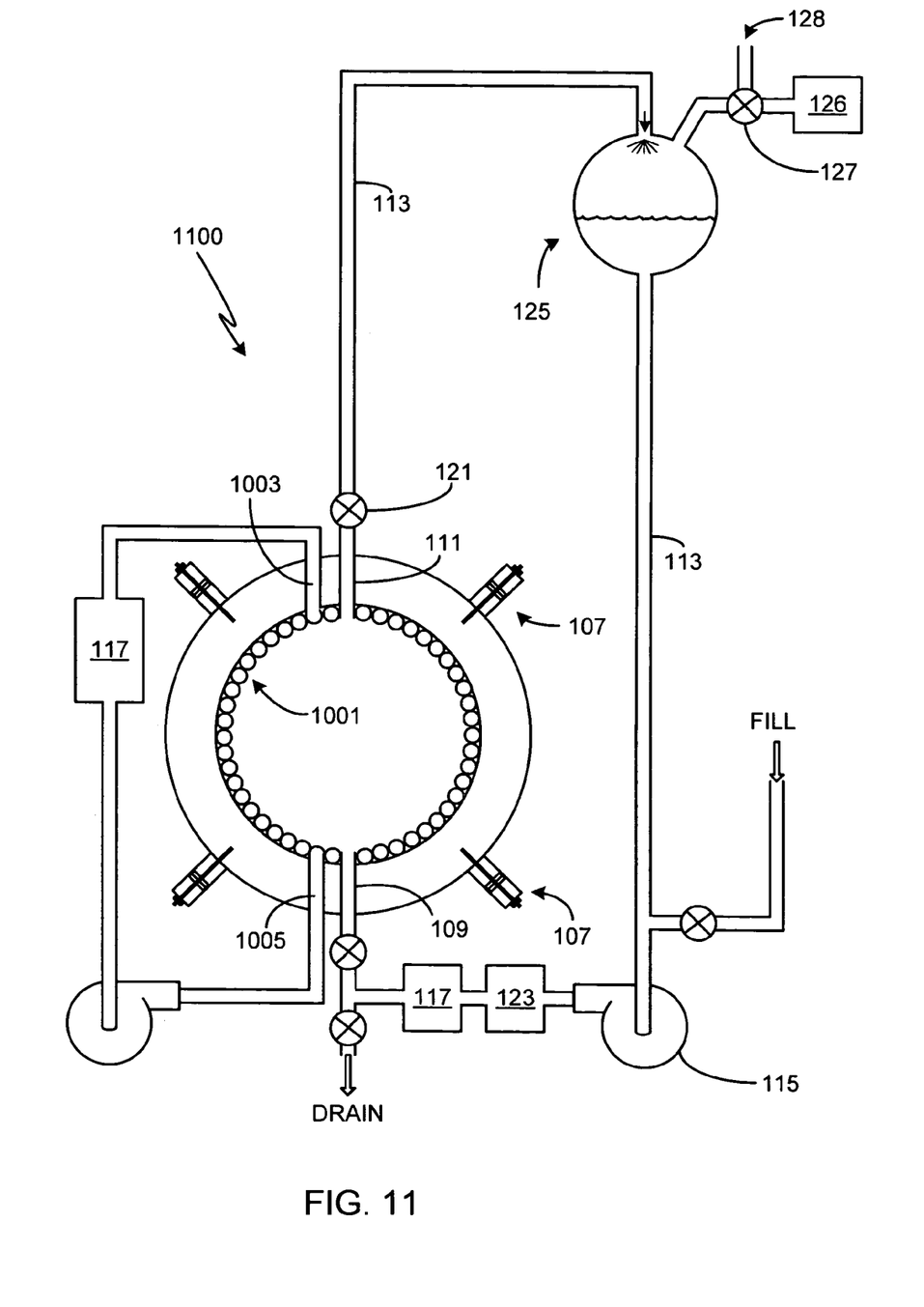
FIG. 11 is an illustration of an alternate embodiment of the invention in which the cavitation fluid passes through a heat exchanger and a second, separate heat exchanger is used with a heat exchange conduit contained within the cavitation chamber.

Although the embodiments shown in FIGS. 1, 3 and 8-10 show a single heat exchanger 117, either coupled to the cavitation medium (i.e., FIGS. 1 and 2) or coupled to a heat exchange system within the cavitation chamber (i.e., FIGS. 8-10), it will be appreciated that the invention is not so limited. For example, either the cavitation medium or the heat exchange fluid can pass through multiple heat exchangers (not shown). Additionally, in some instances the inventor has found that it is beneficial to utilize multiple, and separate, heat exchangers that are coupled to both the cavitation medium and the heat exchange system. Such a system allows, for example, for the cavitation medium entering the cavitation chamber to be maintained at a specific temperature or within a range of temperatures (e.g., through heating, cooling or a combination of both heaters and coolers) while a second heat exchange system controls the temperature within the chamber (e.g., through the withdrawal of excess heat generated by the cavitation process and associated reactions). FIG. 11 illustrates such a system 1100 utilizing heat exchangers 117 on both the cavitation medium subsystem and the heat exchange fluid subsystem. It will be appreciated that such a configuration is not limited to the illustrated subsystems and are equally applicable, for example, to other subsystems such as those illustrated in FIGS. 8 and 9.

It will be appreciated that although the systems disclosed herein include both a degassing system and a heat exchange system, either separately or as a combined system, the apparatus and method of the invention need not utilize both of these systems. For example, the cavitation fluid and chamber can be degassed using a separate, removable degassing system. Alternately, the system may not utilize any heat exchange system, instead operating at ambient temperature or utilizing pre-conditioned cavitation fluids. Furthermore it should be understood that although the preferred embodiment of the invention includes filter 123, such a filter is optional.

Figure 12:
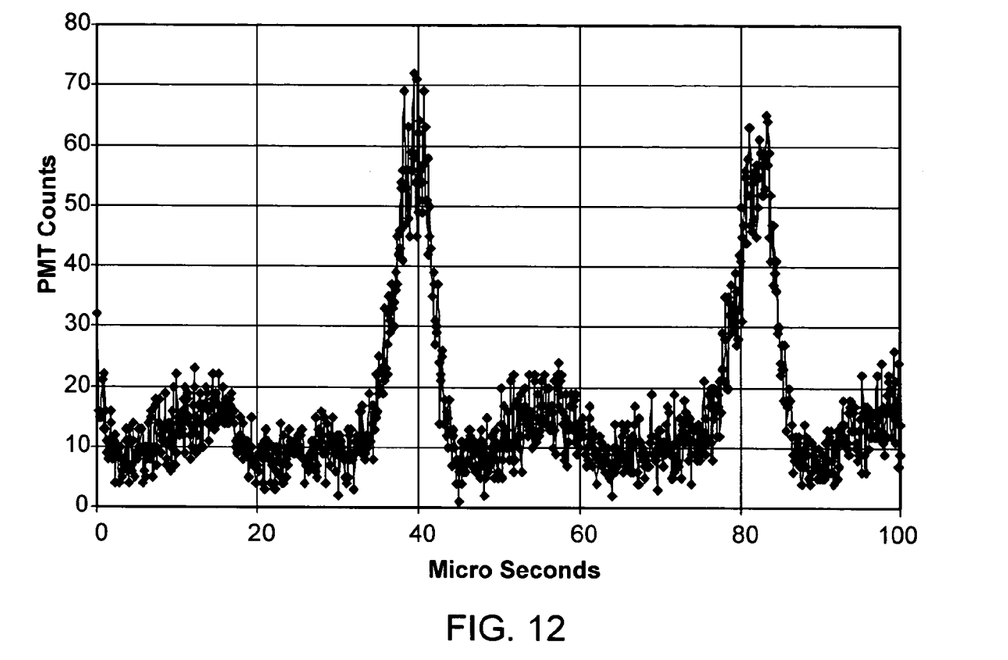
FIG. 12 is a graph of measured sonoluminescence data taken with a stainless steel sphere utilizing acetone at a temperature of −27.5° C.

FIG. 12 is a graph that illustrates the sonoluminescence effect with a stainless steel sphere with an outer diameter of 9.5 inches and an inner diameter of 8 inches. Six acoustic drivers were mounted as illustrated in FIG. 2. The cavitation fluid was acetone cooled to a temperature of −27.5° C. The driving frequency was 23.52 kHz, the driving amplitude was 59 V RMS, and the driving power was 8.8 watts. Two acoustic cycles are shown in FIG. 12. It will be appreciated that the data shown in FIG. 12 is only provided for illustration, and that the invention is not limited to this specific configuration.

As will be understood by those familiar with the art, the present invention may be embodied in other specific forms without departing from the spirit or essential characteristics thereof. For example, by using a conductive material as the cavitation fluid, a magneto-hydrodynamic generator can be coupled to the system. Accordingly, the disclosures and descriptions herein are intended to be illustrative, but not limiting, of the scope of the invention which is set forth in the following claims.

What is claimed is:

1. A cavitation system comprising:
   a cavitation chamber;
   a cavitation medium at least partially contained within a central portion of said cavitation chamber;
   at least one acoustic driver coupled to said cavitation chamber for cavitating said cavitation medium contained within said cavitation chamber;
   an inlet passing through a cavitation chamber wall of said cavitation chamber, wherein said cavitation medium passes through said inlet;
   an outlet passing through said cavitation chamber wall, wherein said cavitation medium passes through said outlet;
   a conduit coupling said inlet and said outlet;
   a heat exchanger coupled to said conduit, said heat exchanger altering a temperature associated with said cavitation medium;
   at least one pump coupled to said conduit, wherein said at least one pump circulates said cavitation medium through said cavitation chamber, said conduit and said heat exchanger;
   a degassing chamber coupled to said conduit and a vacuum pump coupled to said degassing chamber, wherein said cavitation medium passes through said degassing chamber;
   wherein said cavitation chamber, said inlet, said outlet and said conduit are in fluid communication.

2. The cavitation system of claim 1, wherein said at least one pump circulates said cavitation medium through said cavitation chamber, said conduit and said heat exchanger during operation of said cavitation chamber.

3. The cavitation system of claim 1, wherein said at least one acoustic driver is comprised of a transducer.

4. The cavitation system of claim 1, wherein said heat exchanger cools said cavitation medium below ambient temperature.

5. The cavitation system of claim 1, wherein said heat exchanger withdraws heat from said cavitation medium.

6. The cavitation system of claim 1, wherein said heat exchanger heats said cavitation medium above ambient temperature.

7. The cavitation system of claim 1, wherein said heat exchanger heats said cavitation medium above a melting temperature corresponding to said cavitation medium.

8. The cavitation system of claim 1, wherein said heat exchanger further comprises a heat exchange fluid, wherein said heat exchange fluid is in thermal contact with at least a portion of said conduit.

9. The cavitation system of claim 8, wherein said heat exchanger further comprises a heat exchange fluid pump, wherein said heat exchange fluid pump circulates said heat exchange fluid.

10. The cavitation system of claim 1, wherein said heat exchanger further comprises a heat exchange fluid contained in a second conduit, wherein said second conduit is in close proximity to at least a portion of said cavitation medium containing conduit.

11. The cavitation system of claim 10, wherein said heat exchanger further comprises a heat exchange fluid pump, wherein said heat exchange fluid pump circulates said heat exchange fluid through said second conduit.

12. The cavitation system of claim 1, wherein said heat exchanger further comprises a thermoelectric cooler.

13. The cavitation system of claim 1, wherein said heat exchanger further comprises a heat sink.

14. The cavitation system of claim 1, wherein said heat exchanger further comprises a refrigeration system.

15. The cavitation system of claim 1, wherein said heat exchanger further comprises a heating system.

16. The cavitation system of claim 1, further comprising a filter coupled to said conduit, wherein said at least one pump circulates said cavitation medium through said filter.

17. The cavitation system of claim 1 wherein the cavitation chamber is spherical.

18. The cavitation system of claim 1 wherein the at least one acoustic driver is coupled to an upper half portion of the cavitation chamber.

19. The cavitation system of claim 1 wherein the at least one acoustic driver is located at an acoustic pressure antinode.

20. The cavitation system of claim 1 wherein the inlet and outlet are located at displacement nodes.

* * * * *